United States Patent [19]

Romanelli

[11] 3,852,726

[45] Dec. 3, 1974

[54] REMOTE METER MONITOR

[75] Inventor: Pat Romanelli, Harrington Park, N.J.

[73] Assignee: Ram Domestic Products Company, Northvale, N.J.

[22] Filed: July 26, 1973

[21] Appl. No.: 383,300

[52] U.S. Cl. .......................... 340/188 R, 335/152
[51] Int. Cl. ........................................... G08c 19/32
[58] Field of Search .............................. 340/188 R

[56] References Cited
UNITED STATES PATENTS

| | | | |
|---|---|---|---|
| 1,446,552 | 2/1923 | Dunn | 340/188 R |
| 2,216,069 | 9/1940 | Doyle | 340/188 R |
| 2,568,348 | 9/1951 | McCruley | 340/188 R |
| 2,922,994 | 1/1960 | Kennedy | 340/188 R |
| 3,155,955 | 11/1964 | Davidson | 340/188 R |
| 3,511,410 | 5/1970 | Leining | 340/188 R |

Primary Examiner—Thomas B. Habecker
Attorney, Agent, or Firm—Edward F. Levy

[57] ABSTRACT

A meter reader unit comprises a circular array of reed switches in proximate concentric position with the numerals on the dial face of a clock-type utility meter whose pointer has a magnetic free end. The magnetic pointer selectively actuates the reed switches thereby producing a digital signal representing the analog-type meter reading. The digital signals are transmitted by cable to a remote location to provide a numerical digital readout by means of a decade array of light emitting diodes which are electrically in circuit with the reed switches.

7 Claims, 7 Drawing Figures

3,852,726

REMOTE METER MONITOR

BACKGROUND OF THE INVENTION

The present invention relates to remote reading of meters and more particularly to electronic remote reading apparatus for use in monitoring clock-type meters and providing a digital readout thereof at a remote location.

Currently, household and commercial usage of utilities, such as water, gas and electricity, is measured by means of electrical or mechanical meters which are usually located within the building interior of the user. Accordingly, the utility company meter reader must gain access to the interior of the user's building in order to read the meter. In the absence of someone on the user's premises to allow the meter reader access to the meters located in the building interior, the meter reader is forced to return and repeat his attempt to gain entry into the premises to obtain access to the utility meter. Obviously such situations, which are widespread, cause inconvenience, waste of manpower and money. In an effort to avoid such inefficiency, utility companies have adopted the practice of estimating the utility usage by the customer when the company representative cannot gain access to the utility meters for reading purposes. Nevertheless, it still remains necessary for the utility company representative to obtain an actual reading of the meter at some later date to bring the billing of the customer for utility usage up to date. Such inaccessibility to utility meters in temporarily or permanently unoccupied premises represents substantial inconvenience and increased costs both to the utility company and the customer.

In order to overcome such problems associated with interior-located meters, in some cases utility meters have been installed on the exterior of the customer's building o avoid the necessity of gaining access to the building interior. Such outdoor-located meters are susceptible to the adverse effects of weather, such as damage due to freezing, rain, dirt and vandalism.

It is, therefore, an object of the present invention to provide remote meter monitor apparatus which provides remote reading of utility meters and the like.

It is a further object of the present invention to provide remote meter monitor apparatus operative to convert the clock-type meter reading into an electrical digital signal and to provide a digital readout at a position remote from the meter.

BRIEF DESCRIPTION OF THE INVENTION

In accordance with the principles of the present invention there is provided means for detecting the position of the rotatably-driven meter pointer having permanent magnet means attached to the free end thereof mounted in a clock-type meter having a dial face with a circular array of numerals thereon. Means for converting the clock meter reading, indicated by the angular position of the pointer, into a digital electrical signal comprises a housing mounting a circular array of magnetic field responsive elements coaxial with and in register with the circular array of numerals on the meter dial face. The magnetic field produced by the permanent magnet means is operative to selectively actuate the magnetic field responsive element nearest to the permanent magnet means to produce an electrical digital signal. Electrical transmission means interconnecting the magnetic field responsive elements and remote terminal means located at a position remote from the meter transmit the digital electrical signal to the remote terminal means. Portable digital readout means is provided for selective plug-in connection to the remote terminal means and is responsive to the transmitted digital signal to provide a digital readout at the remote location corresponding to the clock meter reading.

Further objects, features and advantages of the present invention will become apparent upon consideration of the following detailed description in conjunction with the drawings as follows:

DETAILED DESCRIPTION OF THE INVENTION

Figure 1:
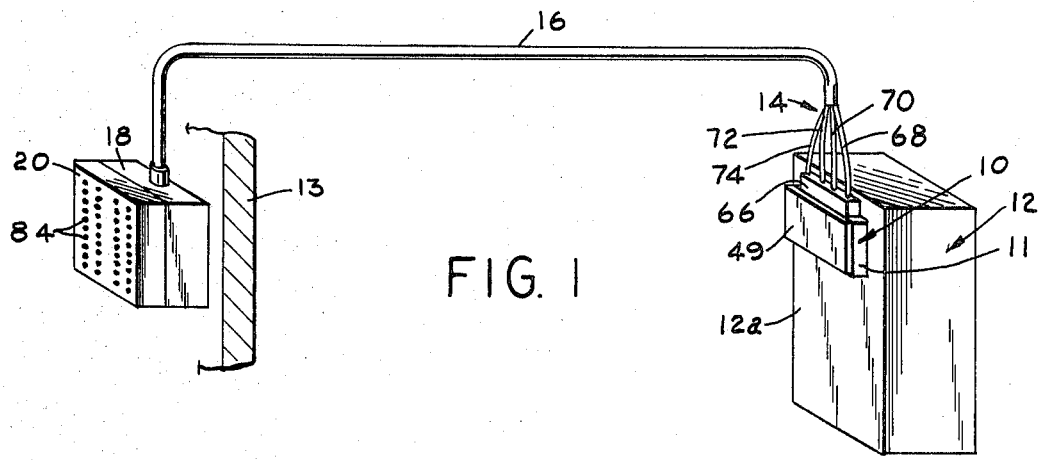
FIG. 1 is an idealized view of the remote meter monitor apparatus of the present invention as connected to a utility meter.

Referring to the drawings, and in particular to FIG. 1 thereof, the remote meter monitor apparatus of the present invention is generally shown as comprising a reader unit 10 which is permanently installed over the dial face of the meter box 12, a transmitter unit 14 including a transmission cable 16 which is adaptable for plug-in attachment to reader unit 10 for transmitting the electrical signals representing the meter reading as indicated by reader unit 10, to a remote location such as the exterior of a building wall 13 where the electrical meter reading signals are converted to a visual reading by monitor unit 20.

Cable 16 terminates at the remote location in a pin socket unit 18 which is permanently fastened to the exterior of building wall 13. A battery-powered portable monitor unit 20, which may be conveniently carried by the utility company meter reader, is adapted for plug-in connection into pin socket unit 18 to provide a visual display of the meter reading originating from the dial face of meter box 12. The meter reading is displayed on the face of monitor unit 20 by means of a decade array of light emitting diodes 84, of which selected ones will become lit, thereby representing in digital form the original analogtype meter reading presented at the dial face of meter box 12.

Figure 2:
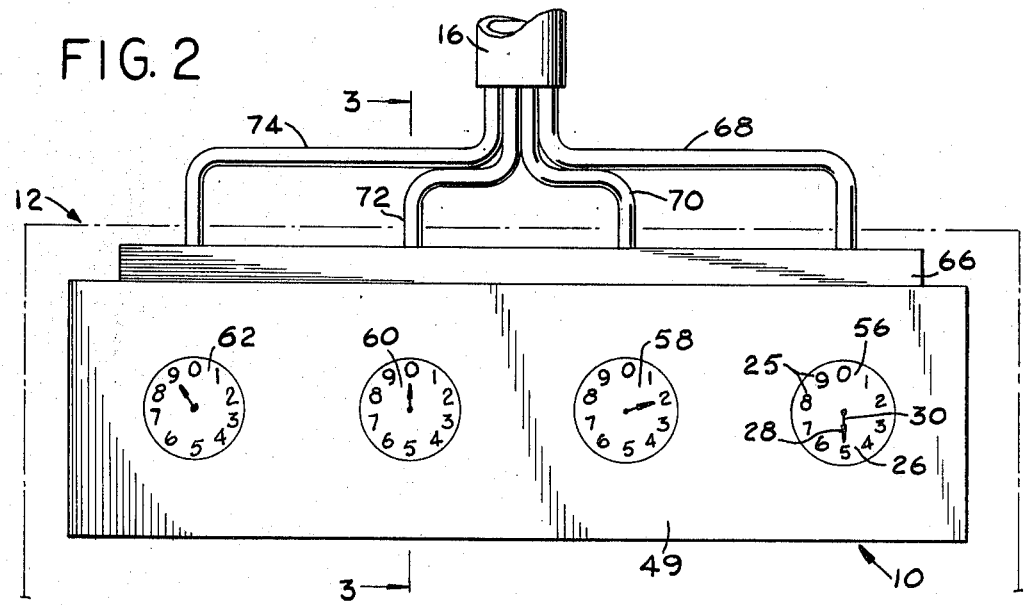
FIG. 2 is front elevation view of one section of the reader unit of the remote meter monitor apparatus of the present invention.
Figure 4:
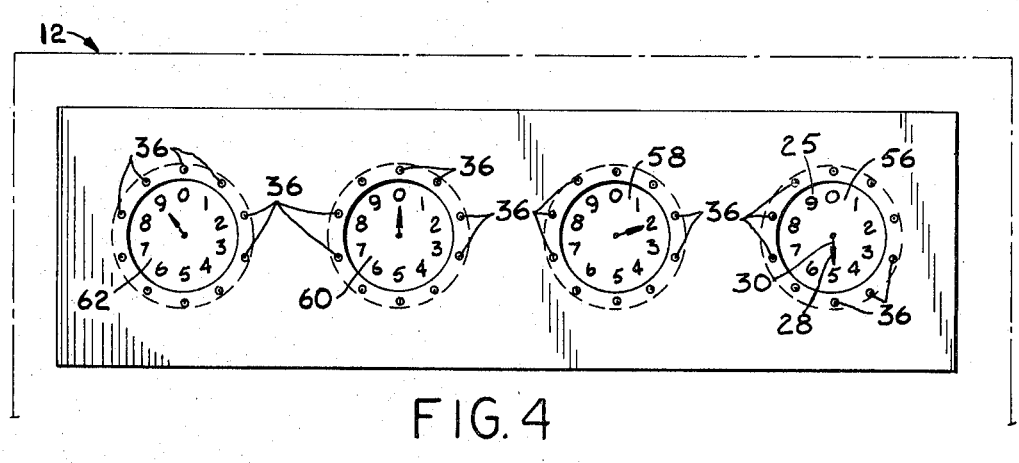
FIG. 4 is a front elevation section view of one section of the transmitter unit, taken along the line 4—4 of FIG. 3.
Figure 3:
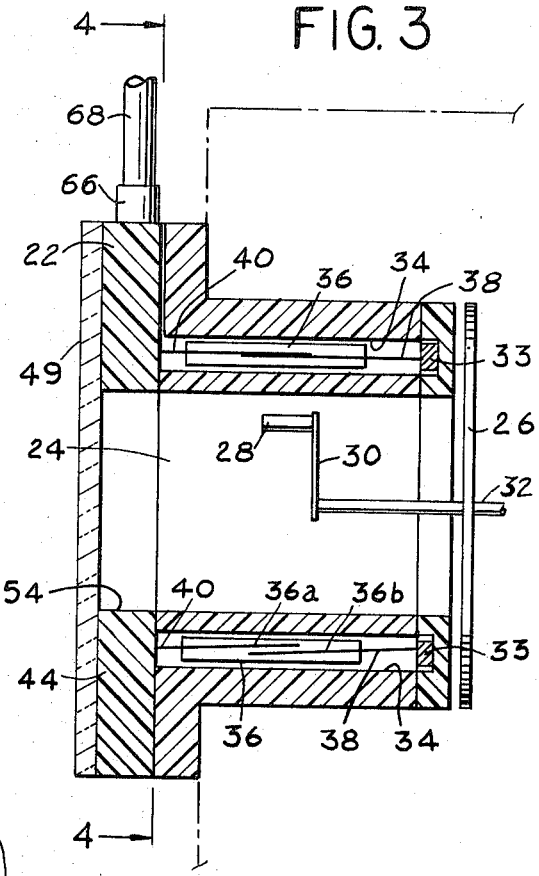
FIG. 3 is an enlarged sectional view of one section of the reader unit taken along the line 3—3 of FIG. 2.

Reference is now made to FIGS. 2 and 3 which show the constructional details of reader unit 10 and the manner in which reader unit 10 converts the analog-type meter reading into electrical digital signals for transmission to the remote location for digital readout.

Reader unit 10 comprises a housing 11 which is mounted over the dial face of meter box 12. Housing 11 comprises a plurality of housing sections 22 which respectively fit over the dials 56, 58, 60 and 62 on the meter dial face representing e.g., volume of gas usage in decade stages of thousands, ten thousands, hundred thousands and millions of cubic feet. Other utilities, e.g., electricity, water, etc. may also be similarly measured in decade stages of appropriate units. In the following discussion, the construction and operation of a single housing section 22 will be described, it being understood that the other housing sections are similar in construction and operation.

Each housing section 22 (FIG. 3) includes a central cylindrical chamber 24 suitably sized to encompass the circular array of numerals 25 on the face of a single meter dial 26. A permanent bar magnet 28 is fixedly mounted to the free end of the meter pointer 30, the latter being driven by a drive shaft 32 extending centrally through dial plate 26.

Housing section 22 includes a circular array of ten spaced cylindrical through bores 34 which are respectively closely adjacent to the numerals on the face of the meter dial pate 26. Cylindrical bores 34 are each suitably sized to receive and position a reed switch 36 therein. The respective leads 38 of the reed switches 36 are connected by a common lead 33 while the opposite reed switch leads 40 terminate in contacts 42 on the front face of a printed circuit board 44 which overlies the front face of housing sections 22. Common lead 33 terminates in a contact 48 on the front face of printed circuit board 44. A sheet of clear plastic 49 overlies printed circuit board 44 to serve as a "see through" cover for reader unit 10.

Figure 5:
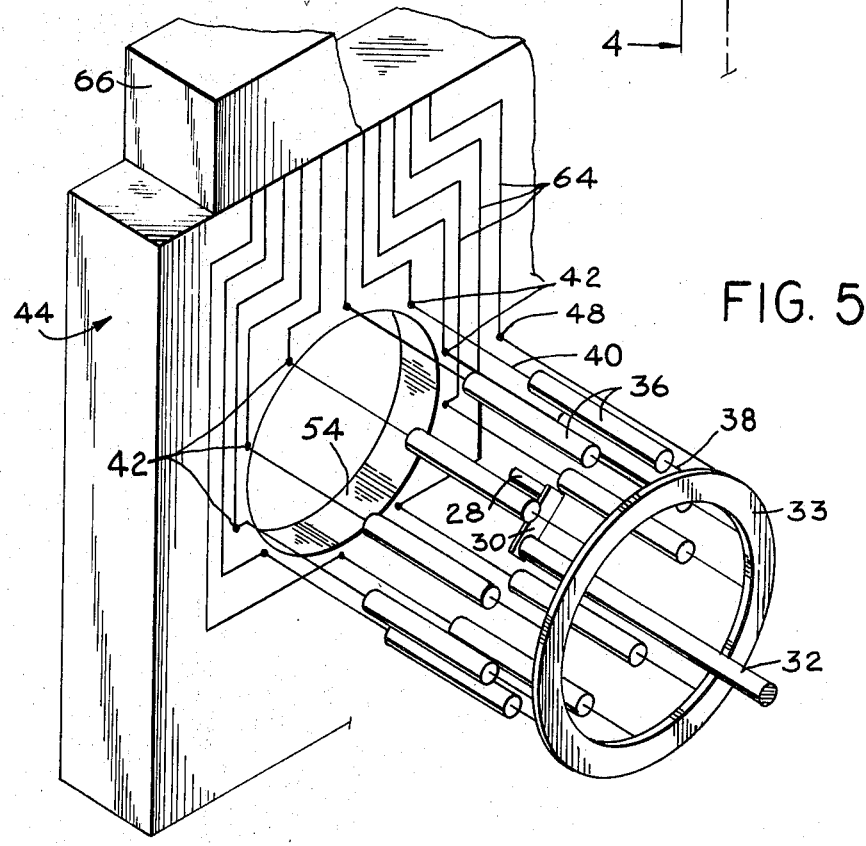
FIG. 5 is an enlarged perspective view of a portion of the reader unit.

Printed circuit board 44 (FIG. 5) is provided with circular openings 54 in register with the dial faces 56, 58, 60 and 62 to permit direct reading of the meter dials through the clear plastic cover 49. Printed circuit board 44 is further provided with leads 64 which run from contacts 42 and 48 to the top edge thereof to permit electrical connection thereto by means of elongated connectors 66. Extending from connectors 66 are cables 68, 70, 72 and 74 each carrying 11 leads, i.e., 10 leads which are connected to reed switch leads 40 and one lead for common lead 33. Cables 68, 70, 72 and 74 are formed into a single cable 16 which terminates in a pin socket box 18, which comprises four columns of 10 socket terminals 75.

Figure 6:
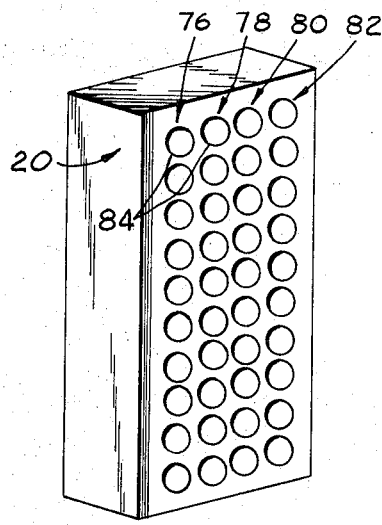
FIG. 6 is a front perspective view of the monitor readout unit of the remote meter monitor apparatus of the present invention.
Figure 7:
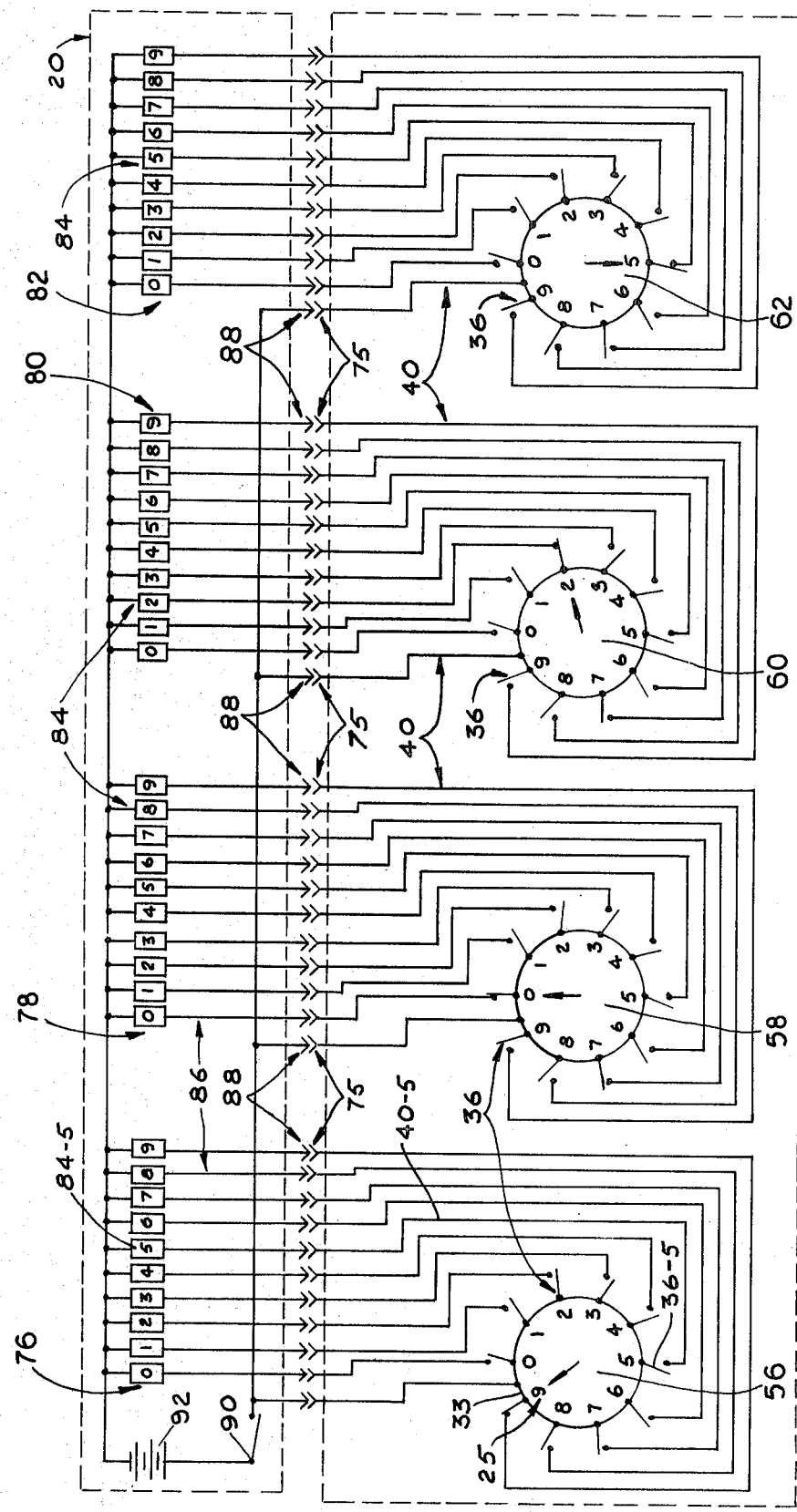
FIG. 7 is an electrical schematic diagram of the remote meter monitor apparatus of the present invention.

Readout unit 20 (FIGS. 6 and 7) comprises four columns 76, 78 80 and 82 of light emitting diodes 84, each of said columns comprising 10 diodes 84 having the numerals 1, 2, 3, . . . 8, 9.0 respectively marked adjacent thereto. A series of 10 leads 86 extend respectively from the diodes 84 in each of the four columns terminating in a series of pin contacts 88 which mate with socket terminals 75.

In operation, when pointer 30 assumes a position adjacent to a particular numeral on the face of dial plate 26, bar magnet 28 will be in sufficient proximity to the particular reed switch 36 associated with that dial face numeral to produce a sufficient magnetic field at the normally-open reed switch contacts 36a, 36b causing contact reed switch 36 to close. Assume for present purposes of illustration, that pointer 30 is adjacent the numeral 5 on the face of dial plate 26 whereby reed switch 36-5 (FIG. 7) is rendered conductive. The utility company reader plugs his hand-held monitor unit 20 into socket unit 18 by inserting pin contacts 88 into the mating socket terminals 75. He then closes switch 90 whereby D.C. battery 92 supplies power for the electrical circuit shown in FIG. 7. As a result, lead 40-5 will carry a voltage which is transmitted via cable 16 to the corresponding socket terminal 75-5, through pin contact 88-5 thereby causing light emitting diode 84-5 to light. Since light emitting diode 84-5 is labelled by the numeral "5" on the outside face of monitor unit 20, the utility company reader is thus able to read the position of pointer 30 on the face of dial plate 26.

In order to avoid any ambiguous reading such as the closing of more than one reed switch 36 under the magnetic influence of magnet 28, magnet 28 should be carefully selected to have the proper magnetic strength so that only the reed switch 36 in closest proximity therewith will be activated. It is recognized that even so, an ambiguity will arise when pointer 30 carrying magnet 28 is midway between two adjacent numerals on the face of dial plate 26, in which case the two light emitting diodes 84 representing these two adjacent numerals will become lit. In such case, the utility company reader will understand that the pointer 30 is midway between the two numerals represented by the lit light emitting diodes and will make his reading accordingly.

When installing reader unit 10 on a preexisting meter box 12, the glass plate (not shown) covering the dial face 26 is removed and a small permanent bar magnet 28 which is permanently attached to pointer 30, by cementing or similar bonding process. Reader housing 11 is then fitted over the dial face 26 so that the chambers 24 are centrally positioned over pointer shafts 32. Reader housing 11 is then hermetically sealed to meter box front wall 12a so that all the meter components within housing chamber 24 as well as reed switches 36 are sealed from the ambient atmosphere so as to be rendered water-proof and explosion proof.

From the foregoing description it is evident that the remote meter monitor apparatus of the present invention provides significant advantages with respect to conventional methods of reading utility meters. When utility meters are installed on the exterior of a building, for example, the gas or water lines must be extended to the exterior building wall which mounts the meter, thereby increasing the risk of accidental explosion in the case of gas, and freezing of water pipes in the case of water meters.

The remote meter monitor of the present invention is easily installed, as just described, and does not interfere in any way with the existing meter mechanism, since it is essentially friction free and therefore does not mechanically load the existing meter mechanism by imposing a drag thereon which might affect the true meter reading. Furthermore, the present remote meter monitor by providing a digital readout of the analog-type meter reading makes it easier for the utility company meter reader to obtain an accurate reading. The low cost of the manufacture and installation of the present remote meter monitor is easily justified in view of the saving in time that would otherwise be spent by the utility company employee in making repeated visits to obtain a meter reading at the interior of the building or by estimating the meter reading based on past usage.

The extremely low current characteristics of light emitting diodes 84, i.e., about 50 ma per diode, permits a relatively small size battery 92 of about 1.5 volts to be employed for energizing the circuitry of the present remote meter monitor, thereby permitting monitor unit 20 to be compact and light-weight.

It is understood that instead of having four columns of light emitting diodes 84 in monitor unit 20 to provide a simultaneous reading of the four meter dials 56, 58, 60 and 62, a single column of 10 diodes 84 may be used together with a four position switch (not shown) to sequentially switch in to the four cables 68, 70, 72 and 74 to obtain a sequential readings of the four meter dials 56, 58, 60 and 62.

Although the invention has been described with reference to a particular embodiment, it is to be understood that this embodiment is merely illustrative of the application of the principles of the invention. Numerous modifications may be made therein and other arrangements may be devised without departing from the spirit and scope of the invention.

What is claimed is:

1. Remote meter monitor apparatus for connection to a circular type meter with a rotatably driven pointer having a magnetic free end, comprising a circular array of spaced magnetic field sensitive elements in proximate concentric peripheral position with respect to the circular sweep of said magnetic free end of said pointer, whereby said magnetic field sensitive elements will be selectively actuated in accordance with the proximate position therewith of said magnetic free end of said pointer to produce a digital electrical signal representing the angular position of said pointer and the reading on said meter, a housing adaptable to be mounted over the dial face of said meter, said housing having a cylindrical chamber for enclosing said meter pointer and a circular array of bores therein surrounding said chamber for receiving and positioning said magnetic field sensitive elements in said concentric peripheral position and perpendicular to said dial face, remote terminal means located at a position remote from said meter, electrical transmission means interconnecting said magnetic field sensitive elements and said remote terminal means for transmitting said digital electrical signal to said remote terminal means, and digital readout means adaptable for connection to said remote terminal means and responsive to said digital electrical signals to provide a digital readout corresponding to the angular position of said pointer.

2. Remote meter monitor apparatus as defined in claim 1, wherein said magnetic field sensitive elements comprise reed switches which are operative to become actuated when subjected to the magnetic field produced by said magnetic free end of said pointer.

3. Remote meter monitor apparatus as defined in claim 2 wherein the magnetic free end of said pointer comprises a permanent magnet.

4. Remote meter monitor apparatus as defined in claim 3 wherein said electrical transmission means comprises a plurality of leads respectively connected to said reed switches, said leads terminating respectively in socket terminals.

5. Remote meter monitor apparatus as defined in claim 4 wherein said digital readout means comprises an array of light emitting elements operative to emit visible light in response to the application thereto of an electrical signal.

6. Remote meter monitor apparatus as defined in claim 5 wherein said light emitting elements comprise light emitting diodes.

7. Remote meter monitor apparatus as defined in claim 6 wherein said light emitting diodes are respectively connected to pin contacts adaptable for respective connection to said socket terminals.

* * * * *